(12) United States Patent
Rakshit et al.

(10) Patent No.: US 10,841,482 B1
(45) Date of Patent: Nov. 17, 2020

(54) RECOMMENDING CAMERA SETTINGS FOR PUBLISHING A PHOTOGRAPH BASED ON IDENTIFIED SUBSTANCE

(71) Applicant: International Business Machines Corporation, Armonk, NY (US)

(72) Inventors: Sarbajit K. Rakshit, Kolkata (IN); Kuntal Dey, Delhi (IN); Pramod Vadayadiyil Raveendran, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/421,027

(22) Filed: May 23, 2019

(51) Int. Cl.
*H04N 5/232* (2006.01)
*H04N 5/272* (2006.01)
*H04N 21/45* (2011.01)
*H04N 21/81* (2011.01)
*H04N 21/2187* (2011.01)

(52) U.S. Cl.
CPC ....... *H04N 5/23216* (2013.01); *H04N 5/2723* (2013.01); *H04N 21/2187* (2013.01); *H04N 21/4524* (2013.01); *H04N 21/812* (2013.01)

(58) Field of Classification Search
CPC ............ H04N 5/23216; H04N 5/2723; H04N 21/2187; H04N 21/4524; H04N 21/812
See application file for complete search history.

(56) References Cited

U.S. PATENT DOCUMENTS

| | | | |
|---|---|---|---|
| 2002/0065808 A1 | 5/2002 | Yu | |
| 2006/0174261 A1* | 8/2006 | Cline, Jr. | H04H 60/375 725/20 |
| 2010/0157086 A1* | 6/2010 | Segale | H04N 5/23212 348/222.1 |
| 2011/0212717 A1* | 9/2011 | Rhoads | G06F 16/58 455/420 |
| 2014/0082648 A1* | 3/2014 | Tanner | G06Q 30/0273 725/14 |
| 2014/0304065 A1 | 10/2014 | Aviv | |

(Continued)

FOREIGN PATENT DOCUMENTS

| | | |
|---|---|---|
| CN | 102982348 A | 3/2013 |
| WO | 2014111874 A1 | 7/2014 |

OTHER PUBLICATIONS

"Micro-Scale Product Placement Advertising", An IP.com Prior Art Database Technical Disclosure, IP.com No. IPCOM000237411D, IP.com Electronic Publication Date: Jun. 17, 2014, 3 pps., <https://priorart.ip.com/IPCOM/000237411>.

*Primary Examiner* — Amy R Hsu
(74) *Attorney, Agent, or Firm* — Marcus Walker (57) ABSTRACT

Aspects of the present invention disclose a method for generating recommendation to include advertisement substance in a photographic area. The method includes one or more processors identifying a photographic area of a camera. The method further includes determining whether the photographic area of the camera includes advertisement substance. The method further includes determining a modification to settings of the camera based on a positioning and focus of the advertisement substance within the photographic area of the camera. The method further includes determining a score corresponding to an image frame that applies the determined modification to the settings of the camera.

20 Claims, 3 Drawing Sheets

(56) References Cited

U.S. PATENT DOCUMENTS

| | | | |
|---|---|---|---|
| 2015/0358537 A1* | 12/2015 | Mirza | G06T 7/0002 |
| | | | 348/231.99 |
| 2016/0026853 A1* | 1/2016 | Wexler | G01S 3/7864 |
| | | | 382/103 |
| 2016/0191775 A1* | 6/2016 | Naguib | G01S 5/0252 |
| | | | 348/207.11 |
| 2017/0223235 A1* | 8/2017 | Kang | H04N 5/341 |
| 2017/0348900 A1* | 12/2017 | Williams | B33Y 50/02 |
| 2018/0054559 A1* | 2/2018 | Welker | H04N 5/23216 |

* cited by examiner

RECOMMENDING CAMERA SETTINGS FOR PUBLISHING A PHOTOGRAPH BASED ON IDENTIFIED SUBSTANCE

BACKGROUND OF THE INVENTION

The present invention relates generally to the field of communications, and more particularly to recommendations for photographs having advertisement substance.

In recent years, a wealth of opportunities for advertising have increased with the continued growth in popularity of social media networks. Within the World Wide Web (WWW) and the Internet, users can access an infinite source of sites, including social media sites where users create content that includes brands, market products, and have direct contact with large consumer groups. Thus, creating the potential for exponential growth of exposure and influence of a message of a company.

Computer vision tasks include methods for acquiring, processing, analyzing and understanding digital images, and extraction of high-dimensional data from the real world. Object recognition is a technology in the field of computer vision for finding and identifying objects in an image or video sequence. The image data can take many forms, such as video sequences, views from multiple cameras, or live feeds of cameras.

Cognitive analytics combines the use of cognitive computing and analytics. Cognitive computing combines artificial intelligence and machine-learning algorithms, in an approach that attempts to reproduce the behavior of the human brain. Analytics is the scientific process of transforming data into insights for making better decisions. Cognitive analytics applies intelligent technologies to bring unstructured data sources within reach of analytics processes for decision making.

SUMMARY

Aspects of the present invention disclose a method, computer program product, and system for generating recommendation to include advertisement substance in a photographic area. The method includes one or more processors identifying a photographic area of a camera. The method further includes one or more processors determining whether the photographic area of the camera includes advertisement substance. The method further includes one or more processors determining a modification to settings of the camera based on a positioning and focus of the advertisement substance within the photographic area of the camera. The method further includes one or more processors determining a score corresponding to an image frame that applies the determined modification to the settings of the camera.

DETAILED DESCRIPTION

Embodiments of the present invention recognize a demand for an intelligent camera system that identifies and captures advertisement substance in a photograph. Consequently, memory of a camera is expended to store photographs of identified objects that provide minimal use for advertising. Some embodiments of the present invention provide a solution where objects are identified and automatically labeled as suitable for advertising based on an image analysis of the identified objects. Various embodiments of the present invention generate camera parameters to capture an identified object in a photograph in real or near real-time. Thus, present invention decreases the amount of stored photographs with minimal advertising use, thus increasing the amount of storage resources, and improving the object recognition capabilities of a digital camera.

Embodiments of the present invention allow for generating recommendation to include advertisement substance in a photographic area. Additional embodiments of the invention generate a notification to a user to publish a stored photograph that includes advertisement substance. Embodiments of the invention determine whether advertisement substance is within or proximate to a photographic area. Embodiments of the invention determine a reward score for a photograph captured using recommended camera settings.

Implementation of embodiments of the invention may take a variety of forms, and exemplary implementation details are discussed subsequently with reference to the Figures.

Figure 1:
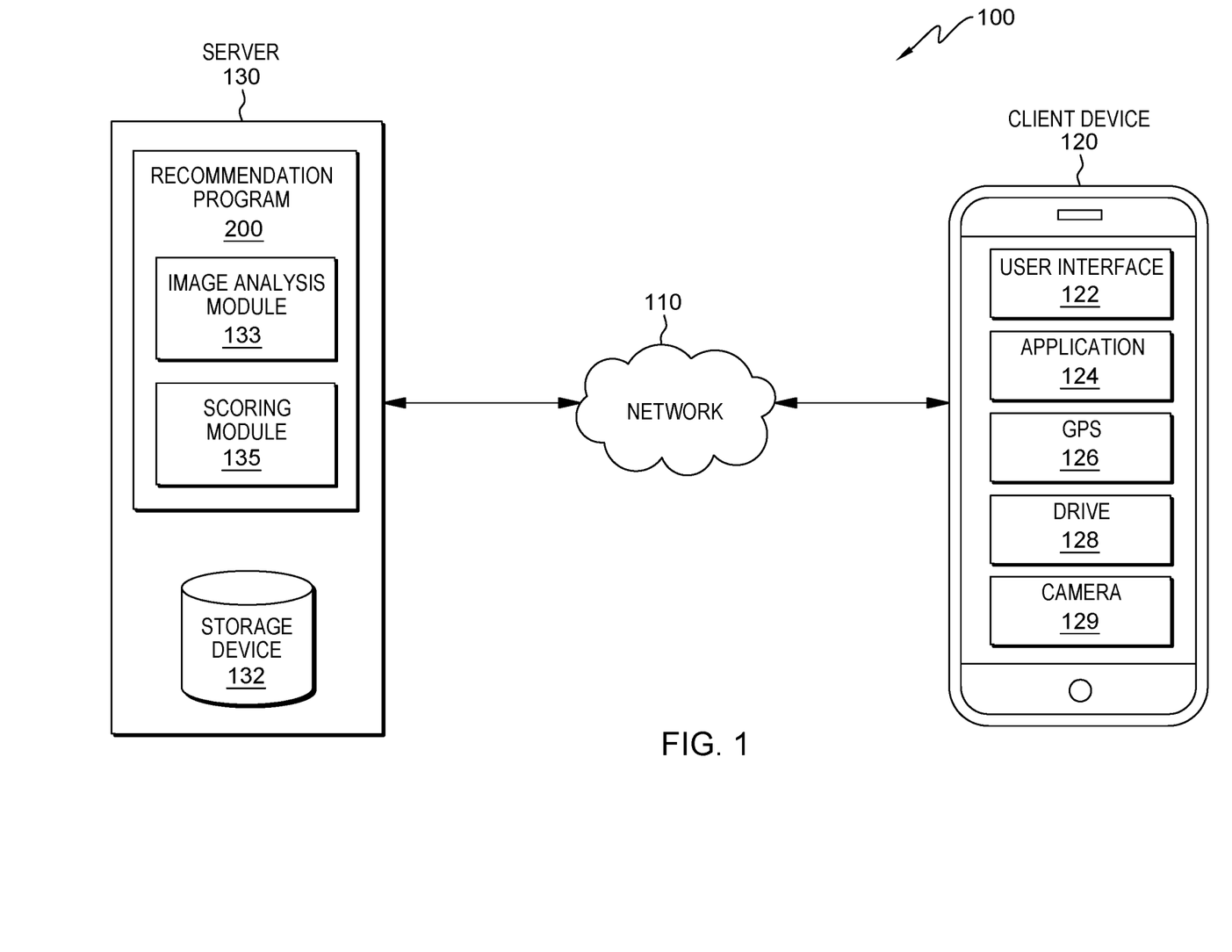
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 120 and server 130 interconnected over network 110. In one embodiment, client device 120, and server 130 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols, which will support communications between client device 120 and server 130, in accordance with embodiments of the present invention.

In various embodiments of the present invention, client device 120 may be a workstation, personal computer, digital camera, digital video recorder (DVR), media player, personal digital assistant, mobile phone, or any other device capable of executing computer readable program instructions, in accordance with embodiments of the present invention. In general, client device 120 is representative of any electronic device or combination of electronic devices capable of executing computer readable program instructions. Client device 120 may include components as depicted and described in further detail with respect to FIG. 3, in accordance with embodiments of the present invention.

Client device 120 includes user interface 122, application 124, global positioning system (GPS) 126, local drive 128, and camera 129. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, a user utilizes application 124 of client device 120 to access content stored in client device 120. For example, application 124 is a software program (e.g., social media application) of a digital camera that a user can utilize to retrieve photographs from the digital camera and upload the photographs to a website.

GPS 126 is a global navigation system that provides geolocation and time information of an object. In one embodiment, GPS 126 provides geolocation and time information of client device 120. In another embodiment, GPS 126 provides geolocation and time information client device 120 to recommendation program 200. For example, client device 120 retrieves and transmits geolocation data of GPS 126 to recommendation program 200.

Drive 128 is a disk or a hard drive physically connected to a device or through a local access network. In one embodiment, drive 128 is a remote network drive on a remote server (not shown) that is connected to client device 120 via network 110. In another embodiment, drive 128 is a local drive that client device 120 utilizes to store images captured using camera 129.

Camera 129 is a camera that captures photographs in digital memory. Generally, camera 129 is a digital camera directly or indirectly connected to client device 120. In one embodiment, recommendation program 200 accesses camera 129 over network 110. For example, recommendation program 200 uses camera 129 to identify advertisement substance in a photographic area. In another example, recommendation program 200 utilizes settings of camera 129 to determine the location of an object within a photographic area.

In an embodiment, recommendation program 200 prompts a user associated with client device 120 to determine whether the user grants recommendation program 200 access to data of client device 120, GPS 126, local drive 128, and camera 129 (i.e., users may opt-in) to collect information about the users store the collected information in storage device 142. For example, a user of client device 120 authorizes recommendation program 200 to utilize all information and data sources that are available accessible in client device 120. In another embodiment, recommendation program 200 prompts a user associated with client device 120 local drive 128 to determine whether the user grants recommendation program 200 permission to use collected information of the associated with the users to identify and store publicly available information associated with the user. For example, recommendation program 200 utilizes all information collected to identify information associated with the users to identify advertisement substance in proximity to a user that is publicly available. In yet another embodiment, recommendation program 200 prompts a user associated with client device 120 to determine whether the user grants recommendation program 200 permission to adjust settings on client device 120. For example, a user of a digital camera allows recommendation program 200 to adjust a zoom and focus setting of the digital camera Server 130 includes storage device 132, image analysis module 133, scoring module 135, and recommendation program 200. Storage device 132 can be implemented with any type of storage device, for example, persistent storage 305, which is capable of storing data that may be accessed and utilized by client device 120 and server 130, such as a database server, a hard disk drive, or a flash memory. Storage device 132 stores numerous types of data which may include database, repository, or subprograms. In various embodiments of the present invention storage device 142 may include a plurality of databases that recommendation program 200 utilizes to analyze the photographic area of client device 120.

Recommendation program 200 may utilize object recognition and cognitive analysis to determine whether an image includes advertisement substance. In one embodiment, recommendation program 200 analyzes an image to determine whether the image has advertisement potential (i.e. determines whether the image includes advertisement data in addition to the non-advertisement content). In another embodiment, recommendation program 200 determines whether advertisement substance is proximate to a photographic area of client device 120. For example, recommendation program 200 can determine whether advertisement substance is proximate to a photographic area of a digital camera by using geotag data of an advertisement or near-field communications (NFC) with other digital cameras to identify the position of a digital camera with respect to the advertisement substance.

In another embodiment, recommendation program 200 generates a recommendation based on an identified object within a photographic area. For example, a photographic are is an area within a frame of a camera. In another embodiment, recommendation program 200 determines a threshold score of an image of client device 120. For example, recommendation program 200 determines a threshold score for an image of a local drive (e.g., drive 128) of a digital camera. In another example, recommendation program 200 determines a threshold score of an image of a live feed of a digital camera in real or near real-time. In yet another embodiment, recommendation program 200 generates a notification for a user that includes a threshold score and/or a recommendation of parameters (e.g., zoom level, focus level, alignment, etc.) for capturing an image.

Image analysis module 133 is a subprogram of recommendation program 200 that is utilized to identify objects in a photograph and determine whether the identified objects match a potential advertisement. In one embodiment, image analysis module 133 identifies an object of video data and utilizes a bot to determine whether the identified object matches an identified advertisement. For example, image analysis module 133 identifies and extracts an object from the photographic area of a live feed from a digital camera. In this example, image analysis module 133 uses metadata of the frame (e.g., creation time, geolocation, etc.) that includes the identified object and a web crawler (e.g., bot) to scrape potential advertisement data (e.g., logos, product names, trademarks, celebrities, etc.) to determine whether the identified object matches an item of the scraped data.

Scoring module 135 is a subprogram of recommendation program 200 that is utilized to determine a threshold score of a photograph. In various embodiments of the present invention, scoring module 135 determines a threshold score based on a public subscription system of ad databases, social engagement score in a social media system, historical social engagement value of similar images, combination of images with personalities, and/or social relevance of images and combination of objects in the images as per the engagement value at various platforms. In one embodiment, scoring module 135 analyzes an image of a feed of camera 129 to determine a threshold score based on objects of the image. For example, scoring module 135 utilizes historical engagement data of a similar image posted on a social media platform and the following (e.g., number of people subscribed) of a personality to determine a threshold score. Thus, based on the identified objects, the context of the image, and the following of a user a threshold score can vary. In this example, a weight of a factor in determining a score may vary based on preferences of an advertiser. In another embodiment, scoring module 135 determines a threshold score for unpublished images of drive 128. For example, a threshold score can be a popularity score, loyalty points, or a quantitative value based on a cumulative of weighted factors.

Figure 2:
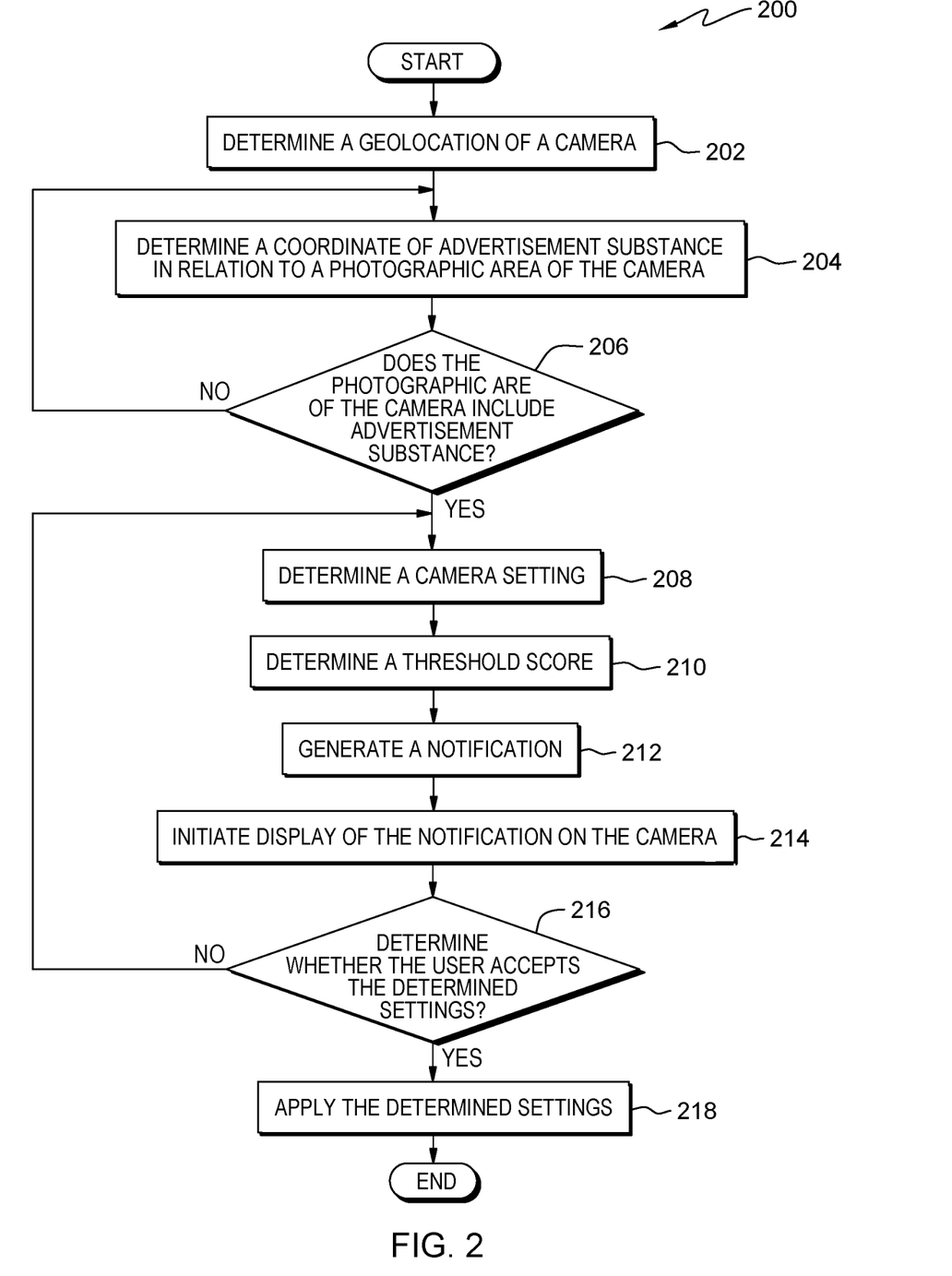
FIG. 2 is a flowchart depicting operational steps of a program for generating recommendation to include advertisement substance in a photographic area, in accordance with embodiments of the present invention.

FIG. 2 is a flowchart depicting operational steps of recommendation program 200, a program for generating recommendation to include advertisement substance in a photographic area, in accordance with embodiments of the present invention. For example, recommendation program 200 initiates in response to a user granting recommendation program 200 access to data of a digital camera (e.g., client device 120). In one embodiment, recommendation program 200 initiates in response to a user opting-in to recommendation program 200. In another embodiment, recommendation program 200 initiates in response to a user powering on client device 120.

In step 202, recommendation program 200 determines a geolocation of a camera. In one embodiment, recommendation program 200 utilizes data of GPS 126 to determine a geolocation of a camera. In another embodiment, recommendation program 200 utilizes data of GPS 126 and data of camera 129 to determine a coordinate location of a photographic area. For example, recommendation program 200 uses the GPS sensor of a digital camera to determine the location of the user and the digital camera. In this example, recommendation program 200 uses the data of the gyroscope and zoom level setting of the digital camera (e.g., camera 129 of a mobile device) along with the previously determined location of the digital camera to determine an orientation of the digital camera with respect to an object of a current frame (e.g., photographic area) of the digital camera.

In step 204, recommendation program 200 determines a coordinate location of advertisement substance in relation to a photographic area of the camera. In one embodiment, recommendation program 200 determines a coordinate location of advertisement substance with respect to a photographic area of the camera. For example, recommendation program 200 uses the parameters of the focus and zoom level setting of the digital camera along with the previously determined location of the digital camera to determine a coordinate location of a first photographic frame (e.g., photographic area or camera field of view) of the digital camera. In this example, recommendation program 200 identifies an object and determines a coordinate location of the object (e.g., a logo, celebrity, product, etc.) in a second photographic frame of the digital camera based on the difference of the parameters of the second photographic frame of the digital camera that includes the object and the parameters of the first photographic frame.

In another example, recommendation program 200 retrieves geo-mapping data of billboards from a database to determine the distance and orientation of billboards (e.g., advertisement substance) that are proximate (e.g., within the optical range of a digital camera) to a first photographic area of a digital camera based on the geolocation of the digital camera and the parameters of the focus and zoom level setting of the digital camera. In this example, recommendation program 200 determines a coordinate location for a photographic area of the digital camera. Additionally, recommendation program 200 compares the current geolocation of the digital camera with the geo-tagged data of the billboard and determines the distance and orientation the billboard in relation to the digital camera. Furthermore, recommendation program 200 determines a set of coordinates for a photographic area that includes the billboard, based on the parameters of the digital camera and the determined relational information. In yet another example, recommendation program 200 uses crowdsourced images or feeds to identify a position of advertisement substance in an area. In this example, recommendation program 200 uses NFC to identify a position of a digital camera with respect to the identified position of advertisement substance.

In decision step 206, recommendation program 200 determines whether a photographic area of a camera includes advertisement substance. In various embodiments of the present invention, recommendation program 200 can consider advertisement substance that is not shown in the photographic area but proximate to the photographic area based on a coordinate location of advertisement substance in the determination of whether the photographic area includes advertisement substance. In one embodiment, recommendation program 200 utilizes image analysis module 133 to determine whether a photographic area of camera 129 or a photograph of drive 128 includes advertisement substance. For example, recommendation program 200 utilizes an image analysis subprogram (e.g., image analysis module 133) to identify objects of a photographic area of a live feed of a digital camera and uses data retrieved by a bot from the Internet to create a database or index of labelled objects (e.g., advertisement substance). In this example, recommendation program 200 compares the identified objects with the labeled objects and determines (in real or near real-time) whether the identified objects in the photographic area are advertisement substance (e.g., celebrities, products, logos, events, trademarks, etc.). In another example, recommendation program 200 analyzes unpublished images that are stored on a local drive (e.g., drive 128) of a computer of a user to determine whether the unpublished images include advertisement substance.

In another embodiment, recommendation program 200 determines whether advertisement substance is proximate to a photographic area of camera 129. For example, recommendation program 200 utilizes a determined coordinate location of nearby advertisement substance to determine whether a photographic area of a live feed of a digital camera is proximate to the advertisement substance. In this example, recommendation program 200 utilizes geo-mapping data of an object to determine whether object is within an optical range of the digital camera of the photographic area of the digital camera (i.e., is the determined coordinate location based on determined relational information within the optical range of coordinate location of the digital camera).

In yet another embodiment, recommendation program 200 determines whether objects of a photographic area of camera 129 include advertisement substance by identifying the objects, which have no pre-tagged advertisement data, and comparing the identified objects with objects of an advertisement database. For example, recommendation program 200 identifies objects proximate to a frame of a digital camera and accesses a remote advertisement database that includes various celebrities, products, logos, events, and/or trademarks (i.e., a database registered with recommendation program 200). In this example, recommendation program 200 dynamically looks up and determines whether the identified objects of the photographic area match any of the objects of the remote advertisement database.

If recommendation program 200 determines that a photographic area of camera 129 does not includes advertisement substance (decision step 206, "NO" branch), then recommendation program 200 continues to monitor the photographic area of camera 129 to detect advertisement substance. For example, if recommendation program 200 compares objects of an image of a live feed of a digital camera to labeled objects and determines that the objects of the image of the live feed of the digital camera do not match any of the labeled data (e.g., celebrities, products, logos, events, trademarks, etc.) that a bot scraped from websites, then recommendation program 200 continues to monitor a field of view of the digital camera for objects that can be utilized in an advertisement. In another example, in response to recommendation program 200 determining that an image of a local drive (e.g., drive 128) does not include advertisement substance, recommendation program 200 analyzes another image of the local drive.

In another embodiment, in response determining that the photographic area of camera 129 does not includes advertisement substance (decision step 206, "NO" branch), recommendation program 200 optionally provides a notification to client device 120. For example, if recommendation program 200 compares objects of an image of a live feed of a digital camera to labeled objects and determines that the objects of the image of the live feed of the digital camera do not match any of the labeled data (e.g., celebrities, products, logos, events, trademarks, etc.) that a bot scraped from websites, then recommendation program 200 can a generate a notification that is displayed in a an overlay of the photographic frame of the digital camera. In this example, the notification can include determined settings (step 208), which can provide directions to the coordinate location of advertisement substance proximate to the coordinate location of the current photographic frame of the digital camera.

In step 208, recommendation program 200 determines a camera setting. More specifically, in response to recommendation program 200 determining that a photographic area of camera 129 includes advertisement substance (decision step 206, "YES" branch), then recommendation program 200 generates a set of parameters for camera 129. For example, recommendation program 200 determines that a photographic area of a digital camera includes a famous athlete in the foreground and an apparel company logo in the background of an image of a live feed of the digital camera during a popular sporting event. In this example, recommendation program 200 generates a focus level and zoom level setting to capture the famous athlete and the logo clearly in the photographic area (i.e., a modification to the original camera settings of the photograph).

In another example, if recommendation program 200 determines that a sign having a coordinate location that is proximate to a first photographic area of a digital camera includes a company trademark (e.g., advertisement substance), then recommendation program 200 generates a camera setting (e.g., zoom level, camera realignment, focus level, etc.) that guides the user to the coordinate location of the sign, so that the coordinate location of the sign is within the first photographic area. In this example, recommendation program 200 recommends a zoom and focus level settings so that the trademark is included in an image of a live feed of the digital camera. In yet another example, in response to recommendation program 200 determining that an image stored on a local drive (e.g., drive 128) includes advertisement substance, recommendation program 200 generates a zoom level setting and recommends that the user publish the photograph (with the zoom level setting applied).

In one embodiment, recommendation program 200 utilizes data of camera 129 and image analysis module 133 to create parameters that include the identified advertisement substance in the photographic area of camera 129. For example, recommendation program 200 retrieves the current camera settings (e.g., focus level, zoom level, etc.) from a digital camera for a current photographic area. In this example, recommendation program 200 identifies the current focus and zoom level settings of the digital camera to determine if the advertisement substance (e.g. logo, icon, object, etc.) in the photographic area is out of focus in an image of a live feed of the digital camera that is being captured. Additionally, recommendation program 200 determines the amount of change in the configuration of the digital camera settings that makes the advertisement substance apparent and in-focus in the image of a live feed of the digital camera.

In another embodiment, recommendation program 200 utilizes data of camera 129 and image analysis module 133 to determine the distance between the advertisement substance and the photographic area of camera 129. For example, recommendation program 200 determines the current coordinates of a frame of a photographic area of a digital camera using the zoom setting and coordinates of the digital camera. In this example, recommendation program 200 utilizes the geolocation of the digital camera and the advertisement substance to determine the distance between the photographic area of the digital camera and the nearby advertisement substance. Additionally, recommendation program 200 determines the amount of change in the alignment of the digital camera that would bring the advertisement substance into an image of a live feed of the photographic area (e.g., field of view).

In step 210, recommendation program 200 determines a threshold score. In one embodiment, recommendation program 200 utilizes image analysis module 133 and scoring module 135 to determine a threshold score of a frame of a photographic area of camera 129 based on one or more factors. For example, recommendation program 200 can use multiple factors (e.g., object analysis, social engagement, historical value, publisher potential, social relevance, etc.) to determine a reward or popularity score (e.g., threshold score) of an image of a live feed of a digital camera. In another example, recommendation program 200 assigns a threshold score of three-thousand (3000) to an image of a live feed of a digital camera that includes a famous athlete and a sign including a trademark associated with the famous athlete (e.g. objects) based on a similar image of a marketing database that had similar objects receiving one-thousand (1000) likes and five-hundred (500) reposts.

In another embodiment, a weight of a factor(s) that recommendation program 200 utilizes to determine a threshold score may vary with the preferences of a user. For example, recommendation program 200 can determine a threshold score of a photograph based on the preferences of a user, where the object of the photograph is weighted higher than the social relevance of the photograph. In this example, recommendation program 200 weighs the popularity of the celebrity (e.g., an actor) or logo in the photograph higher than a weight of an event (e.g., regular season game) or where the photograph is to be captured.

In another example, recommendation program 200 utilizes a database (e.g., celebrity ranking, popular brands, relevant current events, score assignments, etc.) of a remote server (not shown) to determine a threshold score of an image stored on drive 128. In this example, recommendation program 200 assigns a point total to the image based on a current point value assignment of a ranking of the famous athlete in a celebrity database of the remote server. Additionally, recommendation program 200 assigns a point total to the image based on a current point value assignment of a ranking of a logo in a popular brand database of the remote server and combines the point totals to determine the threshold score of the image stored on drive 128.

In step 212, recommendation program 200 generates a notification. In one embodiment, recommendation program 200 generates a notification on client device 120. In various embodiments, upon determining that a photographic area of camera 129 includes advertisement substance, recommendation program 200 may create, re-set, or update a notification to inform a user of a recommendation. In an alternative embodiment, a generated notification may include recommendations (e.g., position alignment, publication, etc.), camera settings, instructions, and/or scores. For example, recommendation program 200 creates a notification that may include generated focus settings, zoom settings, alignment recommendations, and/or indications of corresponding rewards points. In an example scenario, when a user focusses a digital camera toward a photographic area, recommendation program 200 generates a notification that informs the user with instructions to realign the digital camera, camera settings (e.g., zoom level, focus level, etc.), and/or available reward points, if the advertisement substance is captured with the recommended settings.

In step 214, recommendation program 200 initiates display of the generated notification on the camera. In one embodiment, recommendation program 200 initiates display of the generated notification on client device 120. For example, recommendation program 200 transmits the generated notification to client device 120. In this example, client device 120 displays the generated notification on the digital camera screen while the user focuses the digital camera to capture a photograph of the photographic area. In another example, the generated notification can be shown on the screen of a device used to display images of a local or online drive (e.g., drive 128). In another embodiment, the generated notification is a graphical control element. For example, recommendation program 200 initiates instructions to generate a dialog box (e.g., graphical control element) to prompt the user to interact (i.e., accept or deny the settings displayed in the dialog box) with the generated notification.

In decision step 216, recommendation program 200 determines whether the user accepts the determined settings. In various embodiments of the present invention, recommendation program 200 prompts a user to opt-in (i.e., grant recommendation program 200 permission) and allows recommendation program 200 to perform recommended actions utilizing client device 120. In one embodiment, recommendation program 200 monitors user interface 122 to detect whether a user accepts or declines the recommendations included in the generated notification. For example, recommendation program 200 monitors a graphical user interface (GUI) of the digital camera to determine whether a user touches a defined area of the GUI that corresponds to accepting the recommendation of the generated notification displayed on the screen of the digital camera or whether the user touches a defined area of the GUI that corresponds to declining the recommendation of the generated notification. In another embodiment, recommendation program 200 receives a response to the generated notification and determines whether the user accepts the determined settings. For example, recommendation program 200 receives program instructions from an API call of a digital camera that provide a determination of whether the user accepts or declines the recommendation of the generated notification.

If recommendation program 200 determines that the user does not accept the determined settings (decision step 216, "NO" branch), then recommendation program 200 returns to step 208 to determine another set of parameters for client device 120. For example, if recommendation program 200 determines that the user declines the recommendation to realign the camera to capture the famous athlete and a logo associated with a rival brand, then recommendation program 200 determines another set of settings that include a different logo and zoom level settings for a photographic area of the digital camera. In another example, if recommendation program 200 determines that the user declines the recommendation, then recommendation program 200 can guide the digital camera of the user to the coordinates of previously identified advertisement substance using sensor back-tracing (e.g., sensor-based random tree technique). In this example, uses data of the gyroscope and GPS of the camera to provide instructions to direct the user back to an initial coordinate location in relation to the previously identified advertisement. In another embodiment, recommendation program 200 overlays (e.g., augmented reality) the images of the live feed of the digital camera with virtual ad augmentation and/or reward points.

In step 218, recommendation program 200 applies the determined settings. More specifically, in response to recommendation program 200 determining that the user accepts the determined settings (decision step 216, "YES" branch), then recommendation program 200 applies the determined settings. For example, if recommendation program 200 determines that the user accepts the determined settings of the generated notification, then recommendation program 200 adjust the settings of the digital camera. In this example, recommendation program 200 performs these actions automatically if the user gave permission to recommendation program 200 to control the zoom and focus settings of the digital camera. In another example, recommendation program 200 provides the user with rewards points in response to the user accepting the determined settings.

In one embodiment, recommendation program 200 implements the determined settings of the generated notification on client device 120. For example, recommendation program 200 automatically adjusts the zoom and focus levels to the recommended settings in order to capture the famous athlete and a sign that includes a logo that the famous athlete is associated with in the photographic area of the digital camera. In this example, recommendation program 200 gives the user the displayed amount of reward points of the generated notification in response to acceptance of the determined settings. In another example, recommendation program 200 provides executable instructions to a remote-control gimbal to rotate the digital camera to an alignment that would capture the famous athlete and a sign that includes a logo that the famous athlete is associated with in the photographic area of the digital camera.

Figure 3:
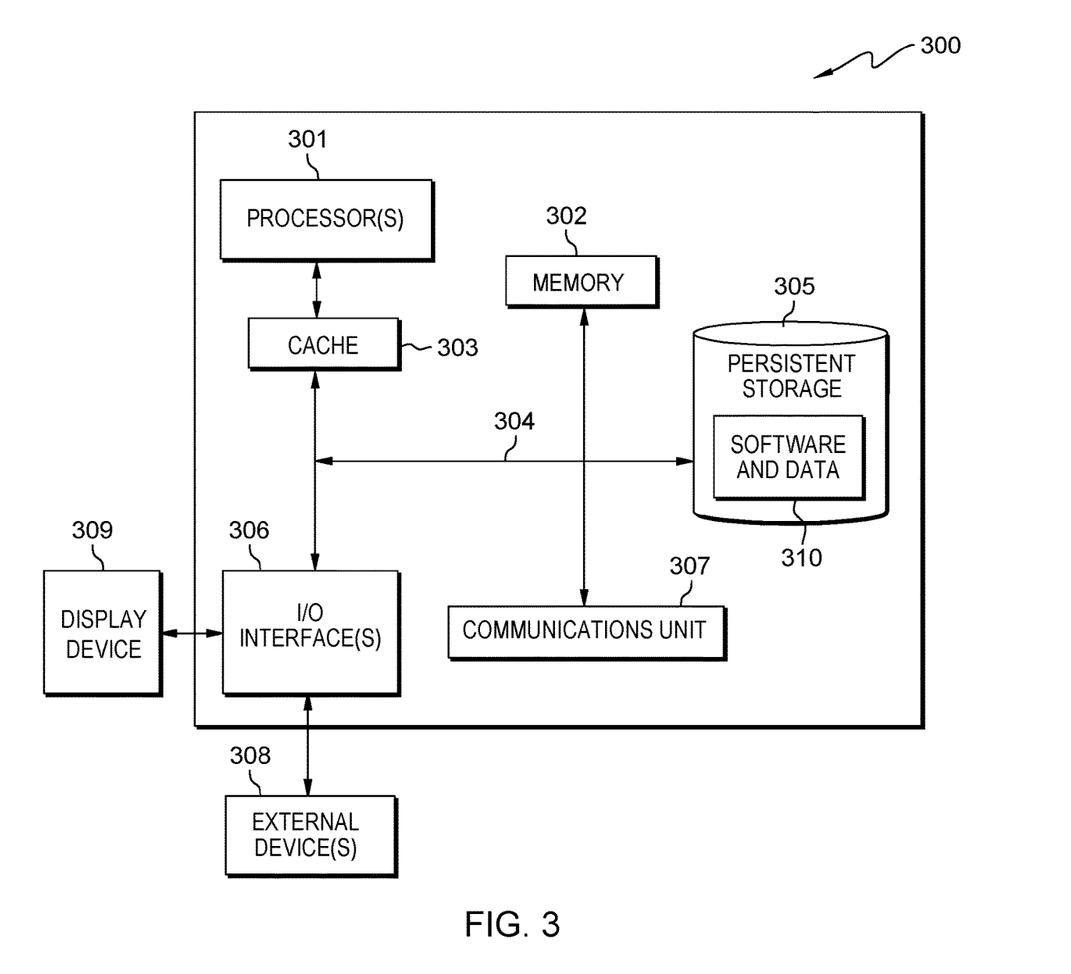
FIG. 3 depicts a block diagram of components of a computing system representative of the client device, listening device, and server of FIG. 1, in accordance with an embodiment of the present invention.

FIG. 3 depicts computer system 300, which is representative of client device 120 and server 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. Computer system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 120, software and data 310 includes data of application 124, GPS 126, drive 128, and camera 129. With respect to server 130, software and data 310 includes data of recommendation program 200, image analysis module 133, and scoring module 135.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   identifying, by one or more processors, a photographic area of a camera;
   determining, by one or more processors, a location of advertisement substance with respect to the location of the photographic area utilizing settings of the camera;
   determining, by one or more processors, whether the photographic area of the camera is proximate to the advertisement substance;
   determining, by one or more processors, a modification to the settings of the camera based on the location of the advertisement substance within proximate to the photographic area of the camera, wherein the determining the modification to the settings of the camera further comprises:
      determining, by one or more processors, an amount of change in the settings of the camera, wherein the amount of change brings the advertisement substance into the photographic area of the camera; and determining, by one or more processors, a score corresponding to an image frame that applies the determined modification to the settings of the camera.

2. The method of claim 1, further comprising:
generating, by one or more processors, a notification for a user, wherein the notification includes an option to apply the determined modification to the settings of the camera and an indication of the determined score;
initiating, by one or more processors, display of the generated notification on the camera; and
in response to determining that the user accepts application of the determined modification to the settings of the camera, applying, by one or more processors, the determined modification to the settings of the camera.

3. The method of claim 1, further comprising:
determining, by one or more processors, whether the photographic area of the camera includes advertisement substance, wherein determining whether the photographic area includes advertisement substance further comprises:
identifying, by one or more processors, an object of the photographic area, wherein the photographic area is selected from a group consisting of: a stored image and a frame of a live feed of a field of view of the camera;
comparing, by one or more processors, the identified object to an object that is labeled as advertisement substance; and
determining, by one or more processors, whether the identified object corresponds to the labeled object, wherein the labeled object is selected from a group consisting of:
people, products, logos, events, and trademarks.

4. The method of claim 1, wherein determining whether the photographic area of the camera is proximate to the advertisement substance, further comprises:
determining, by one or more processors, a location of the camera;
determining, by one or more processors, a location of the advertisement substance; and
determining, by one or more processors, whether the advertisement substance is within a defined proximity to the location of the camera, based at least in apart the location of the advertisement substance, wherein the defined proximity corresponds to an optical range of the camera.

5. The method of claim 1, wherein settings of the camera are selected from a group consisting of: zoom level, focus level, or alignment.

6. The method of claim 1, wherein identifying a photographic area of the camera, further comprises:
determining, by one or more processors, a geolocation of the camera; and
determining, by one or more processors, a coordinate location of the photographic area of the camera based at least in part on the determined geolocation and settings of the camera.

7. The method of claim 4, wherein determining whether the advertisement substance is within the defined proximity to the location of the camera, further comprises:
determining, by one or more processors, a defined area of the camera, wherein the defined area includes one or more sets of coordinates of an optical range of the camera; and
determining, by one or more processors, whether the defined area of the camera includes the determined location of advertisement substance.

8. A computer program product comprising:
one or more computer readable storage media and program instructions stored on the one or more computer readable storage media, the program instructions comprising:
program instructions to identify a photographic area of a camera;
program instructions to determine a location of advertisement substance with respect to the location of the photographic area utilizing settings of the camera;
program instructions to determine whether the photographic area of the camera is proximate to the advertisement substance;
program instructions to determine a modification to the settings of the camera based the location of the advertisement substance proximate to the photographic area of the camera, wherein the program instructions to determine the modification to the settings of the camera further comprises program instructions to:
determine an amount of change in the settings of the camera, wherein the amount of change brings the advertisement substance into the photographic area of the camera; and
program instructions to determine a score corresponding to an image frame that applies the determined modification to the settings of the camera.

9. The computer program product of claim 8, further comprising program instructions, stored on the one or more computer readable storage media, to:
generate a notification for a user, wherein the notification includes an option to apply the determined modification to the settings of the camera and an indication of the determined score;
initiate display of the generated notification on the camera; and
in response to determining that the user accepts application of the determined modification to the settings of the camera, apply the determined modification to the settings of the camera.

10. The computer program product of claim 8, further comprising program instructions, stored on the one or more computer readable storage media, to:
determine whether the photographic area of the camera includes advertisement substance, wherein program instructions to determine whether the photographic area includes advertisement substance further comprises program instructions to:
identify an object of the photographic area, wherein the photographic area is selected from a group consisting of: a stored image and a frame of a live feed of a field of view of the camera;
compare the identified object to an object that is labeled as advertisement substance; and
determine whether the identified object corresponds to the labeled object, wherein the labeled object is selected from a group consisting of: people, products, logos, events, and trademarks.

11. The computer program product of claim 8, wherein program instructions to determine whether the photographic area of the camera is proximate to the advertisement substance, further comprise program instructions to:
determine a location of the camera;
determine a location of the advertisement substance; and
determine whether the advertisement substance is within a defined proximity to the location of the camera, based at least in apart the location of the advertisement substance, wherein the defined proximity corresponds to an optical range of the camera.

12. The computer program product of claim 8, further comprising program instructions, stored on the one or more computer readable storage media, to: wherein the settings of the camera are selected from a group consisting of: zoom level, focus level, or alignment.

13. The computer program product of claim 8, wherein program instructions to identify a photographic area of the camera, further comprise program instructions, to:
    determine a geolocation of the camera; and
    determine a coordinate location of the photographic area of the camera based at least in part on the determined geolocation and settings of the camera.

14. The computer program product of claim 11, wherein program instructions to determine whether the advertisement substance is within the defined proximity to the location of the camera, further comprise program instructions to:
    determine a defined area of the camera, wherein the defined area includes one or more sets of coordinates of an optical range of the camera; and
    determine whether the defined area of the camera includes the determined location of advertisement substance.

15. A computer system comprising:
    one or more computer processors;
    one or more computer readable storage media; and
    program instructions stored on the computer readable storage media for execution by at least one of the one or more processors, the program instructions comprising:
    program instructions to identify a photographic area of a camera;
    program instructions to determine a location of advertisement substance with respect to the location of the photographic area utilizing settings of the camera;
    program instructions to determine whether the photographic area of the camera is proximate to the advertisement substance;
    program instructions to determine a modification to the settings of the camera based on the location of the advertisement substance proximate to the photographic area of the camera, wherein the program instructions to determine the modification to the settings of the camera further comprises program instructions to:
        determine an amount of change in the settings of the camera, wherein the amount of change brings the advertisement substance into the photographic area of the camera; and
    program instructions to determine a score corresponding to an image frame that applies the determined modification to the settings of the camera.

16. The computer system of claim 15, further comprising program instructions, stored on the one or more computer readable storage media, to:
    generate a notification for a user, wherein the notification includes an option to apply the determined modification to the settings of the camera and an indication of the determined score;
    initiate display of the generated notification on the camera; and
    in response to determining that the user accepts application of the determined modification to the settings of the camera, apply the determined modification to the settings of the camera.

17. The computer system of claim 15, further comprising program instructions to:
    determine whether the photographic area of the camera includes advertisement substance, wherein program instructions to determine whether the photographic area includes advertisement substance further comprises program instructions to:
        identify an object of the photographic area, wherein the photographic area is selected from a group consisting of: a stored image and a frame of a live feed of a field of view of the camera;
        compare the identified object to an object that is labeled as advertisement substance; and
        determine whether the identified object corresponds to the labeled object, wherein the labeled object is selected from a group consisting of: people, products, logos, events, and trademarks.

18. The computer system of claim 15, wherein program instructions to determine whether the photographic area of the camera is proximate to the advertisement substance, further comprise program instructions to:
    determine a location of the camera;
    determine a location of the advertisement substance; and
    determine whether the advertisement substance is within a defined proximity to the location of the camera, based at least in apart the location of the advertisement substance, wherein the defined proximity corresponds to an optical range of the camera.

19. The computer system of claim 15, wherein program instructions to identify a photographic area of the camera, further comprise program instructions to:
    determine a geolocation of the camera; and
    determine a coordinate location of the photographic area of the camera based at least in part on the determined geolocation and settings of the camera.

20. The computer system of claim 18, wherein program instructions to determine whether the advertisement substance is within the defined proximity to the location of the camera, further comprise program instructions to:
    determine a defined area of the camera, wherein the defined area includes one or more sets of coordinates of an optical range of the camera; and
    determine whether the defined area of the camera includes the determined location of advertisement substance.

* * * * *